Figure 1:
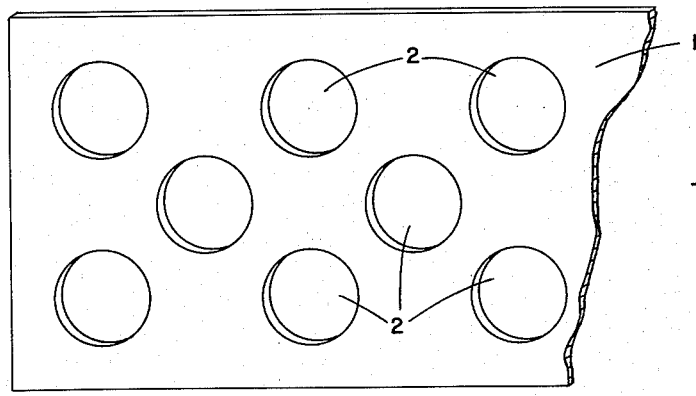

Oct. 17, 1961 M. H. BINSTOCK 3,004,906
URANIUM FOIL NUCLEAR FUEL ELEMENT
Filed Nov. 9, 1956

INVENTOR.
MARTIN H. BINSTOCK
BY
Gerald A. Koris
ATTORNEY 3,004,906
URANIUM FOIL NUCLEAR FUEL ELEMENT
Martin H. Binstock, Tarzana, Calif., assignor to
North American Aviation, Inc.
Filed Nov. 9, 1956, Ser. No. 621,255
9 Claims. (Cl. 204—154.2)

My invention relates to an improved nuclear reactor fuel element, and more particularly to an improved fuel plate for a plate-type fuel element.

For information concerning the theory, construction and operation of nuclear reactors, reference is made to U.S. Patents 2,708,656 and 2,714,577, Fermi et al.; Glasstone, "Principles of Nuclear Reactor Engineering" (D. Van Nostrand Co.); Schultz, "The Control of Nuclear Reactor" (McGraw-Hill); "The Reactor Handbook" (3 volumes), published by the U.S. Atomic Energy Commission; and to "The Proceedings of the International Conference on the Peaceful Uses of Atomic Energy," held in Geneva, Switzerland, August 1955, and available for sale at the United Nations' Book Store, New York, New York. For information concerning the fabrication of the plate or MTR-type of fuel element, reference is made to the Geneva Conference paper of J. E. Cunningham and E. J. Boyle entitled "MTR-Type Fuel Elements." For specific information concerning reactors which employ this type of fuel element, attention is invited to the Geneva Conference paper of A. M. Weinberg et al. entitled "The Materials Testing Reactor and Related Research Reactors." As shown in the Cunningham paper, the plate-type fuel element consists of a plurality of long, slightly curved or flat plates comprising a core of uranium-aluminum alloy and a thin cladding of aluminum metal, resulting in a sandwich-type of construction. The cladding is used to retain fission products within the fuel and to protect the uranium from corrosion or other damage by the coolant. The plates are assembled in a hollow, rectangular, long box-like frame to form a composite fuel element.

This type of fuel element is fairly satisfactory and is in general use. The element possesses certain drawbacks, however. Aluminum forms a workable alloy with uranium at only rather highly aluminum concentrations, for example, 85% aluminum-15% uranium, by weight. Therefore, the uranium for this alloy must be highly enriched (e.g., approximately 90%) in a thermal neutron fissible isotope U-233 or U-235. Thus, this type of fuel plate would not be suitable where lower degrees of uranium enrichment are required for technical reasons or to meet administrative requirements, as in export reactors where the use of only 20% enriched material is presently permitted.

An ideal fuel element would have to meet many strict requirements. The element would have to be sound from an economic viewpoint by permitting low cost fabrication and reprocessing. The element should be capable of long life at high burn-ups and be of chemically compatible and corrosion-resistant material. The element would further have to withstand radiation effects without distortion or other loss of physical integrity.

Uranium metal has previously been used in the unalloyed or unmixed form in the form of rods at least approximately one-eighth inch diameter. A certain thickness is necessary to provide strength against the distortion uranium is subject to from the effects of nuclear radiations and fission products. Uranium undergoes an alpha-beta phase transformation at approximately 660° C., which also causes distortion. The rod form, then, is needed for structural integrity. However, the rod form, as contrasted with the plate-type element, has a lower surface area-to-volume ratio which results in poorer heat transfer properties. A uranium metal core in a plate-type element, providing structural integrity could be maintained, would be highly desirable as it would be economical of fabrication and decontamination and would provide the heat transfer characteristics needed for elevated temperature applications.

An object of my present invention, accordingly, is to provide an improved nuclear reactor fuel element.

Another object is to provide a plate-type nuclear fuel element with a core of uranium metal.

Another object is to provide such a fuel element of high structural integrity.

Still another object is to provide such a fuel element of fabricational simplicity which lends itself to economical decontamination.

Yet another object is to provide such a fuel element capable of long life and high burn-up at elevated temperatures.

Other objects and advantages of my invention will become apparent from the following detailed description, taken together with the attached claims and the accompanying drawings.

Figure 2:
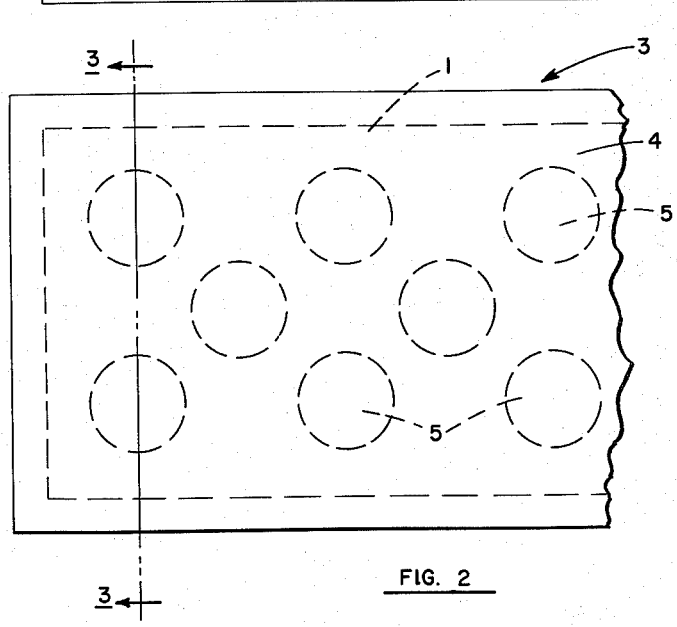
Figure 3:
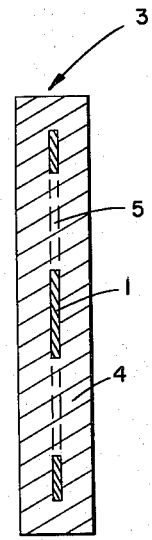
Figure 4:
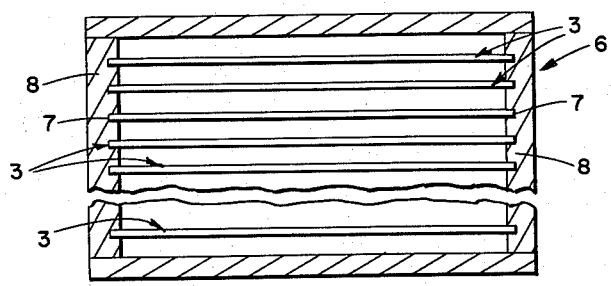

In the drawings, FIGURE 1 is a plan view of the core of my fuel element, FIGURE 2 is a plan view partly in section, of a clad fuel plate, FIGURE 3 is a section through 3—3 of FIGURE 2, and FIGURE 4 is a section of the fuel plates assembled into a fuel element.

In accordance with my present invention, I have provided a fuel plate for a plate-type fuel element which comprises a core of perforated uranium metal, and cladding bonded to said uranium core. This fuel element may be easily fabricated since alloying or otherwise dispersing the uranium in a diluent matrix, which must be separated therefrom for reprocessing, is not necessary. Distortion normally caused by radiation effects on uranium metal is avoided by the inherent strength of this fuel plate. The perforations in the uranium permit direct contact between the cladding on either face of the perforated uranium foil, thus achieving a riveting action which greatly strengthens the foil.

FIGURE 1 represents a uranium foil 1 which is typically in the order of 3 to 5 mils thick. The perforations 2 account for approximately 30% to 70% of the surface area of the foil, approximately 40% being preferred, and are obtained simply by punching uranium metal.

As shown in FIGURES 2 and 3, the fuel plate 3 is formed by placing perforated foil 1 into a tube 4 of suitable metallurgical and nuclear properties (low thermal neutron absorption cross-section); the tube is then evacuated and sealed off. Suitable sheathing materials are aluminum, stainless steel and zirconium. If desired, small coins of the cladding metal may be placed in the perforations to insure good riveting action and a flat surface for the plate. The metallurgical bond between the tube and the foil is obtained by known metallurgical methods, for example, by cold or hot pressing. The preferred method, which retains the desired grain size and direction (beta grain size, non-orientated), is hot pressing at a temperature of approximately 550° C. to 600° C. and a pressure of approximately 15 tons per square inch. The riveted portions 5, filling perforations 2, are shown in phantom.

Aluminum tends to react with uranium to form the compound $UAl_4$, which results in a poor bond between core and cladding and reducts corrosion resistance of aluminum. When aluminum cladding is used, this is prevented by depositing an intermediate, thin barrier layer of nickel metal, for example, approximately 0.5 mil, on the uranium by electrolytic or chemical means (from an aqueous solution of nickel ammonium phosphite). The nickel forms a metallurgical bond with both aluminum and uranium and prevents the diffusion of uranium in aluminum.

FIGURE 4 shows the finished fuel plates 3 assembled into a frame 6, conventionally a rectangular, hollow box of the same material as the cladding but somewhat thicker. The plates are positioned longitudinally through frame 6, parallel to each other. The plates 3 are set in longitudinal grooves or recesses 7 in side plates 8 of frame 6. The plates are secured therein by such methods as brazing with an aluminum-silicon eutectic (11–13 weight percent silicon) or by fusion welding. Hollow, tapered end pieces are attached to the ends of the composite fuel element, as illustrated in the Cunningham paper, supra, for insertion into the supporting grid plate of a reactor core.

A 15 plate fuel element of the above type is found to be completely interchangeable with the standard 18 plate MTR (Materials Testing Reactor) fuel element and may thus be used in any of the many reactors using the MTR element. The MTR fuel element contains 180 grams U–235 per element, regardless of the exact number of plates. The dimensions of such an element would be: frame, ⅛″ aluminum, 3″ x 3″ x 2′, 60 mil longitudinal grooves; fuel plate composition, 5 mil uranium metal core, 20% enriched U–235 and 40% void area, 35 mil aluminum cladding; and dimensions of each fuel plate, 2 ft. long.

This fuel element is also interchangeable with the fuel element described in the copending application of the common assignee, S.N. 621,305, filed the same day as the present application, now U.S. Patent 2,985,571, in the names of Martin H. Binstock and Kenneth E. Horton for "Lead-Uranium Nuclear Fuel Element."

It should be understood that the examples and configurations of my inventions are by way of illustration only and are not restrictive. My invention is understood to be limited only as is indicated in the appended claims.

Having thus described my invention, I claim:

1. A fuel plate for a plate-type nuclear fuel element comprising an integral sheet of uranium metal foil, said sheet having a plurality of perforations, a cladding bonded to said metal foil, the cladding surfaces being joined together through said perforations in said foil to impart structural integrity to said fuel plate.

2. The fuel element of claim 1, wherein said cladding is a chemically compatible, corrosion resistant metal of relatively low thermal neutron absorption cross section.

3. The fuel element of claim 1, wherein said cladding is selected from the group consisting of aluminum, zirconium and stainless steel.

4. The fuel element of claim 1, wherein said perforations comprise approximately 30 to 70% of the surface area of said uranium sheet.

5. A fuel plate for a plate-type nuclear reactor fuel element which comprises a core of perforated uranium metal foil, a thin coating of nickel metal thereon, and a metallurgically bonded cladding of aluminum metal on said coated uranium, the cladding surfaces of said fuel plate being joined together through the perforations in said uranium to impart structural integrity to said fuel plate.

6. A method of making a fuel plate for a plate-type nuclear reactor fuel element which comprises perforating a uranium metal foil, inserting said perforated metal into a tube of a cladding material having a relatively low thermal neutron absorption cross section and metallurgically bonding said metal and said tube together, thereby joining the cladding surfaces of said fuel plate together through the perforations in said uranium to impart structural integrity to said fuel plate.

7. The method of claim 6, wherein said cladding material is selected from the group consisting of aluminum, zirconium and stainless steel.

8. A method of preparing a fuel plate for a plate-type nuclear reactor fuel element which comprises perforating a uranium metal foil, said perforations comprising approximately 30 to 70% of the surface area of said foil, plating a thin coating of nickel metal upon said perforated uranium, inserting said coated uranium into an aluminum tube, evacuating the uranium filled tube, sealing said tube off, and hot pressing the resulting composition together to form a metallurgical bond between said coated uranium and said aluminum, thereby joining the aluminum surfaces of said plate together through the perforations in said uranium.

9. The method of claim 8, wherein said uranium is approximately 20% enriched in uranium-235.

References Cited in the file of this patent

UNITED STATES PATENTS

| | | |
|---|---|---|
| 1,132,902 | Bauer | Mar. 23, 1915 |
| 1,278,816 | Agren | Sept. 17, 1918 |
| 1,605,443 | Kennedy | Nov. 2, 1926 |
| 2,813,073 | Saller et al. | Nov. 12, 1957 |
| 2,820,751 | Saller | Jan. 21, 1958 |
| 2,831,806 | Wigner | Apr. 22, 1958 |
| 2,837,818 | Storchheim | June 10, 1958 |
| 2,848,800 | Maloney et al. | Aug. 26, 1958 |
| 2,872,388 | Fahnoe et al. | Feb. 3, 1959 |

FOREIGN PATENTS

| | | |
|---|---|---|
| 758,545 | Great Britain | Oct. 3, 1956 |

OTHER REFERENCES

BMI–69, June 1, 1951, available from OTS, Dept. of Commerce, Washington, D.C., or TIS, P.O. Box 62, Oak Ridge, Tenn.

BMI–934, Aug. 3, 1954, TIS, Post Office Box 62, Oak Ridge, Tenn.

Cunningham et al.: "Proceedings of the International Conference on the Peaceful Uses of Atomic Energy," vol. 9, p. 205 (Aug. 8–Aug. 20, 1955).

Glasstone: "Principles of Nuclear Reactor Engineering," p. 766, D. Van Nostrand Co., Inc., New York (1955).

Roboff et al.: "The Sylvania Technologist" (January 1956) vol. IX, No. 1, pp. 2–6.